United States Patent
Iulo et al.

(10) Patent No.: US 7,315,856 B2
(45) Date of Patent: Jan. 1, 2008

(54) CONSOLIDATED MONITORING SYSTEM AND METHOD USING THE INTERNET FOR DIAGNOSIS OF AN INSTALLED PRODUCT SET ON A COMPUTING DEVICE

(75) Inventors: Bernard Iulo, Poughkepsie, NY (US); Walter A. Manrique, Poughkeepsie, NY (US)

(73) Assignee: Lenovo (Singapore) Pte Ltd., Singapore (SG)

( * ) Notice: Subject to any disclaimer, the term of this patent is extended or adjusted under 35 U.S.C. 154(b) by 0 days.

(21) Appl. No.: 11/222,607

(22) Filed: Sep. 9, 2005

(65) Prior Publication Data

US 2006/0025964 A1 Feb. 2, 2006

Related U.S. Application Data

(62) Division of application No. 10/008,742, filed on Nov. 5, 2001, now Pat. No. 7,107,257.

(51) Int. Cl.
G06F 7/00 (2006.01)
G06F 17/30 (2006.01)
G06F 11/00 (2006.01)

(52) U.S. Cl. .......................... 707/3; 707/10; 707/102; 714/2; 714/48

(58) Field of Classification Search .................. 707/10, 707/3, 101, 102; 714/2, 48
See application file for complete search history.

(56) References Cited

U.S. PATENT DOCUMENTS

| | | | |
|---|---|---|---|
| 5,253,184 A | 10/1993 | Kleinschnitz | 364/550 |
| 5,287,505 A | 2/1994 | Calvert et al. | 395/600 |
| 5,375,070 A | 12/1994 | Hershey et al. | 363/550 |
| 5,491,791 A * | 2/1996 | Glowny et al. | 714/37 |
| 5,528,516 A | 6/1996 | Yemini et al. | 364/551.01 |
| 5,539,877 A | 7/1996 | Winokur et al. | 395/183.02 |
| 5,590,056 A | 12/1996 | Barritz | 364/550 |
| 5,596,712 A | 1/1997 | Tsuyama et al. | 395/183.02 |
| 5,619,621 A | 4/1997 | Puckett | 395/51 |
| 5,655,081 A | 8/1997 | Bonnell et al. | 395/200.32 |
| 5,729,472 A | 3/1998 | Seiffert et al. | 364/550 |

(Continued)

OTHER PUBLICATIONS

Oracle8i Release Notes, Release 3 for Windows NT, Nov. 16, 2000, Oracle®.

(Continued)

*Primary Examiner*—Kuen S. Lu
(74) *Attorney, Agent, or Firm*—Cantor Colburn LLP

(57) ABSTRACT

A method, system, and storage medium and system for managing computer system performance utilizing information acquired over the Internet is provided. The system comprises a user system having existing installed components that include software, hardware devices, system upgrades, and/or a peripheral device. The system also includes a consolidated monitoring tool executing on the workstation that monitors activities occurring on the workstation with respect to the existing installed components. The system further includes a communications link to a vendor system that supplies components and/or services to the user system. Upon encountering a minor error, the consolidated monitoring tool searches a database for the minor error, displays a corresponding explanation of the minor error for a user via translation tables stored in the workstation, and displays a corresponding set of action items for resolving the minor error or preventing a future occurrence of the minor error.

18 Claims, 4 Drawing Sheets

U.S. PATENT DOCUMENTS

| | | | |
|---|---|---|---|
| 5,796,633 A | 8/1998 | Burgess et al. | 364/551.01 |
| 5,812,826 A | 9/1998 | McLain, Jr. | 395/500 |
| 5,835,911 A | 11/1998 | Nakagawa et al. | 707/203 |
| 5,941,996 A | 8/1999 | Smith et al. | 714/47 |
| 5,974,412 A | 10/1999 | Hazlehurst et al. | 707/3 |
| 6,085,244 A * | 7/2000 | Wookey | 709/224 |
| 6,289,511 B1 * | 9/2001 | Hubinette | 717/173 |
| 6,401,217 B1 * | 6/2002 | Clark et al. | 714/20 |
| 6,457,142 B1 * | 9/2002 | Klemm et al. | 714/38 |
| 6,493,871 B1 * | 12/2002 | McGuire et al. | 717/173 |
| 6,529,784 B1 * | 3/2003 | Cantos et al. | 700/79 |
| 2006/0143493 A1 * | 6/2006 | Meis et al. | 714/4 |

OTHER PUBLICATIONS

Oracle® Enterprise Manager, Concepts Guide, Release 2.0, Jan. 31, 1999, ORACLE®.

Oracle8i Installation Guide, Enterprise Edition Release 3 for Windows NT, Nov. 2000, ORACLE®.

Oracle® Enterprise Manager, Getting Started with Oracle Diagnostics Park, Release 2.2, Sep. 2000, ORACLE®.

Oracle® Enterprise Manager, Getting Started with Oracle Management Park for the Oracle Applications, Release 2.2, Sep. 2000, ORACLE®.

Oracle® Enterprise Manager, Getting Started with Oracle Change Management Pack, Release 2.2, Sep. 2000, ORACLE®.

* cited by examiner

CONSOLIDATED MONITORING SYSTEM AND METHOD USING THE INTERNET FOR DIAGNOSIS OF AN INSTALLED PRODUCT SET ON A COMPUTING DEVICE

CROSS REFERENCE TO RELATED APPLICATIONS

This application is a divisional of U.S. patent application Ser. No. 10/008,742, filed Nov. 5, 2001, (U.S. Pat. No. 7,107,257, issued Sep. 12, 2006) the contents of which are incorporated by reference herein in its entirety.

BACKGROUND

This invention relates generally to managing computer system performance, and more particularly, the present invention relates to a consolidated monitoring system and method using the Internet for diagnosing installed product sets on a computing device.

The popularity of the Internet and the ease of use of newer computers have made it possible for people with minimal computer skills to accept computers as a new household appliance. However, many of these new users lack the skills necessary to diagnose computer problems based on currently available solutions. Typically, when a computer device runs into a malfunction, the execution of the desired task is cut short and a series of highly technical and non-verbose computer messages are generated and presented to the user. The user is then faced with the challenge of diagnosing the computer problem in order to complete the task. The vast majority of computer users are not computer experts and so the natural response to many personal computer problems is to reboot. Rebooting, however, is not always effective in correcting the malfunction. Different types of system errors require different corrective actions. The highly technical error messages and program faults typically displayed for the lay person are not generally helpful, both in terms of understanding the nature of the problem as well as how to correct it. Many of these messages fail to go away despite attempts to ignore or bypass them. Another type of system error occurs when a program running on the system fails to terminate despite a proper termination request by the user. Even if the program does finally terminate, it sometimes fails to release a given device which may then cause other programs to fail. The lay user is once again left with no corrective tools or preventive solutions.

What is needed is a method and system for assisting a user who encounters a program error by providing a simple explanation of the error and easy to understand action items for this user to take in order to eliminate or prevent these situations. What is also needed is a method and system for providing detailed system and product information that a user can relay to a service provider or product vendor such as current product level and maintenance data, as well as information relating to about activities that have transpired in the system for diagnostic purposes.

BRIEF SUMMARY

A method, system, and storage medium and system for managing computer system performance utilizing information acquired over the Internet is provided. The system comprises a user system having existing installed components that include software, hardware devices, system upgrades, and/or a peripheral device. The system also includes a consolidated monitoring tool executing on the workstation that monitors activities occurring on the workstation with respect to the existing installed components. The system further includes a communications link to a vendor system that supplies components and/or services to the user system. Upon encountering a minor error, the consolidated monitoring tool searches a database for the minor error, displays a corresponding explanation of the minor error for a user via translation tables stored in the workstation, and displays a corresponding set of action items for resolving the minor error or preventing a future occurrence of the minor error.

BRIEF DESCRIPTION OF THE DRAWINGS

Referring now to the drawings wherein like elements are numbered alike in the several FIGURES.

DETAILED DESCRIPTION OF THE PREFERRED EMBODIMENT

Figure 1:
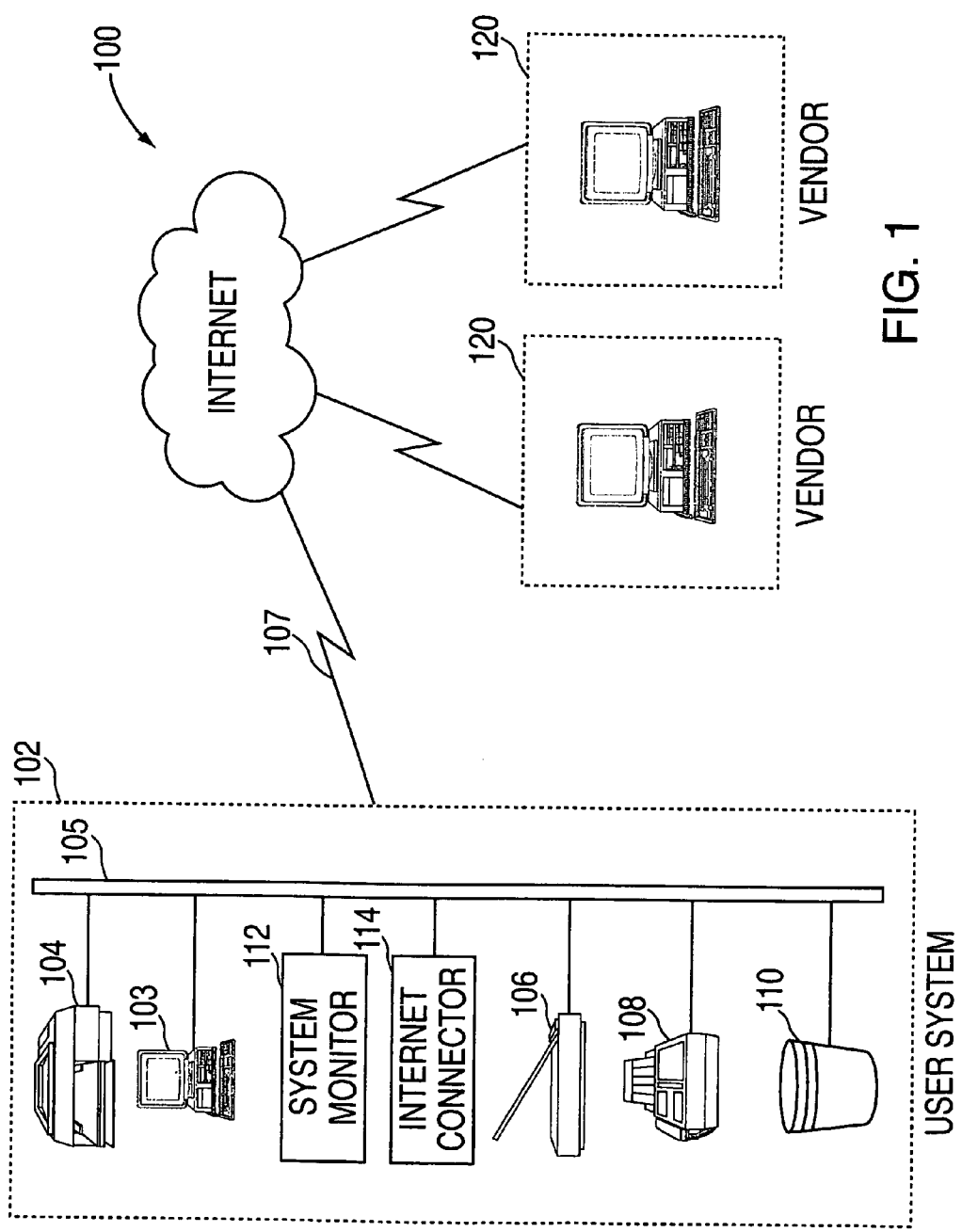
FIG. 1 is a block diagram of a network system upon which the consolidated monitoring tool is implemented in a preferred embodiment of the invention.

In an exemplary embodiment, the consolidated monitoring tool is implemented in a network environment such as system 100 of FIG. 1. System 100 includes a user system 102 connected to the Internet via a communications link 107. User system 102 includes a workstation 103 connected to a communications cable 105. Workstation 103 is preferably a personal computing device and includes a monitor, an input device, memory, and a data processor. Further, workstation 103 may operate various software applications such as word processing, graphics arts tools, computer games and other typical software used by personal computer owners. Workstation 103 is also Internet-enabled, that is, capable of linking up with other network systems outside of user system 102 via a data or communications link such as communication link 107 under a subscription arrangement with an online service provider utilizing telephone lines and a modem, or perhaps via high speed cable lines and an Ethernet adapter or other similar communications systems. Workstation 103 is preferably executing communications software such as an email program and web browser program. For purposes of illustration, user system is an IBM® NetVista desktop computer. Additional components (also referred to as 'peripheral devices') shown in user system 102 include a printer 104, a scanner 106, a facsimile 108, and a data storage facility 110, all of which are in communication with workstation 103 via communications cable 105. Alternatively, these components may be in communication with workstation 103 via wireless technologies.

Workstation 103 also executes the consolidated monitoring tool which further comprises a system monitor application 112 executing on top of the operating system of workstation 103, and an Internet connector application 114. Alternatively, system monitor application 112 can be installed on a network server in an office environment (not shown). System monitor application 112 monitors activities occurring during system operation of workstation 103 and intercepts errors that may occur. Once an error is detected, system monitor application 112 retrieves translation data from data storage facility 110 and provides this information to an end user on workstation 103 for information, possible corrective action, as well as preventative actions. Information retrieved from data storage facility 110 may be, in part, provided by Internet connector application 114 which gathers information relating to a product installed on user system 102 via the Internet in order to facilitate system configuration services and maintenance services. These services are further described in FIGS. 2 and 3.

Vendor systems 120 may be service providers for user system 102 and may be product vendors whose products or components are installed on user system 102. Vendor systems 120 each include a computing device comprising a monitor, input device, memory, and a data processor. Vendor systems 120 also each include communications software and devices for communicating with user system 102. Such software and devices may include a modem, web browser program, email program, Internet service connection or a combination of the above. Preferably, each of vendor systems 120 operates a web site for providing product information and updates to product users such as user system 102.

As indicated above, the consolidated monitoring tool of the invention provides system configuration and maintenance services for an end user as well as diagnostic services when an error occurs during system operation. System monitor application 112 configures a computing device such as workstation 103 based on data gathered by Internet connector application 114. Configuration services include querying a system in order to determine all the devices, features, and programs installed therein, as well as the effects that these items have on each other and on the system as a whole. Since all configuration is controlled by system monitor application 112, it can optimally choose the best configuration for the specific computing device. In other words, user system 102 will automatically configure itself upon installation of a new application.

Figure 2:
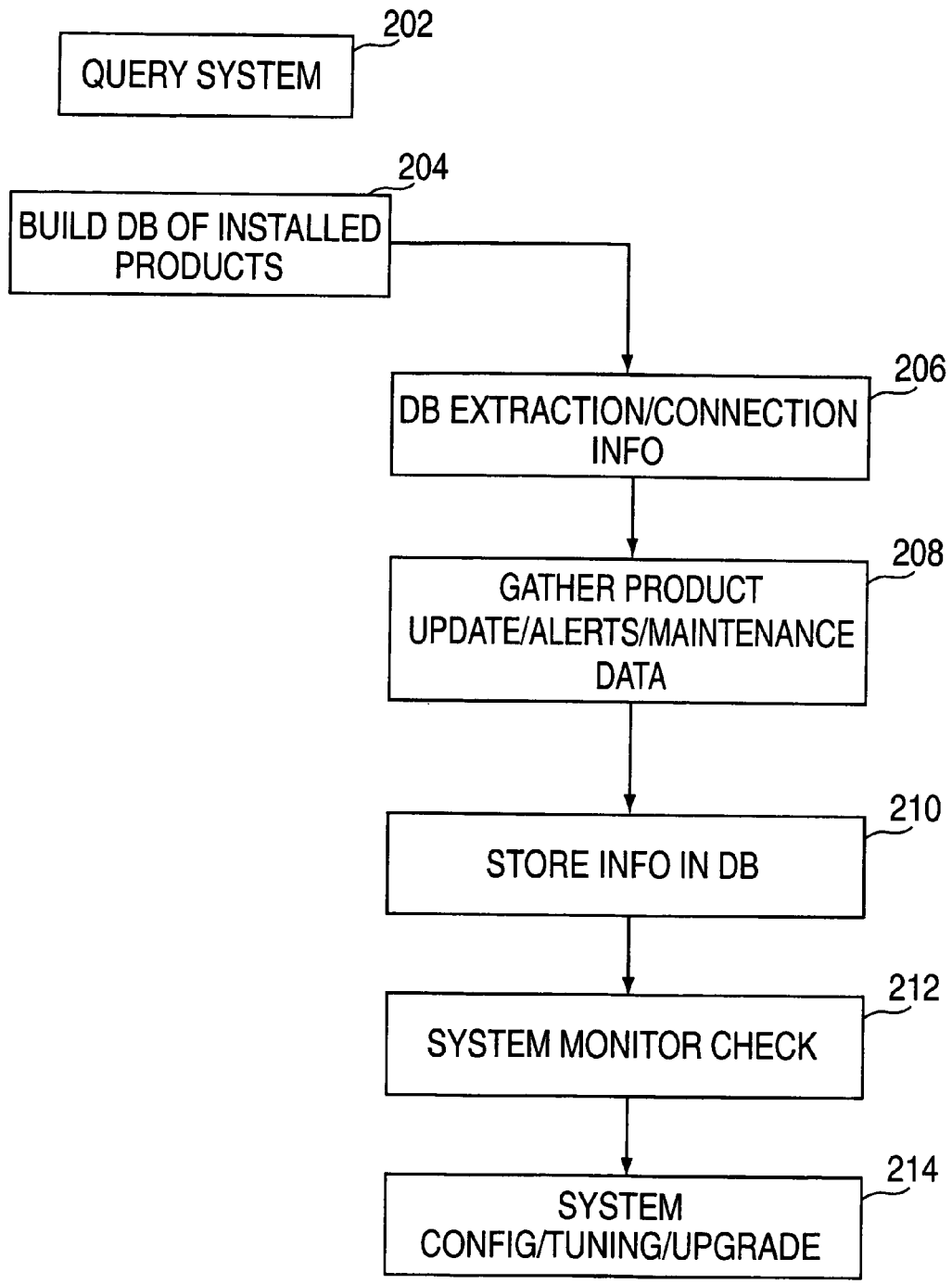
FIG. 2 is an exemplary process flowchart describing the configuration and tuning services provided by the consolidated monitoring tool during product installation.

FIG. 2 illustrates how the consolidated monitoring tool configures a user system upon installation of a new component, or alternatively, upon initial installation of the consolidated monitoring tool itself. Product or component installation may include installation of a new software application, a peripheral device or accessory (e.g., printer, facsimile, scanner), a system upgrade such as adding additional memory to a system's hard drive, etc. Upon installation of a product, system monitor application 112 queries user system 102 for an inventory of all installed components at step 202. Utilizing this information, system monitor 112 builds a database of these products, storing information such as the product name, the product's current release level, maintenance level, and a web site address for the product's vendor at step 204. This database is herein referred to as a consolidated monitoring tool database. Information contained in consolidated monitoring tool database may be stored in data storage facility 110. Internet connector application 114 then extracts connection information from the consolidated monitoring tool database concerning the product vendor such as one of vendor systems 120 at step 206 and attempts to connect to the product vendor. Once connected, at step 208 Internet connector application 114 checks the vendor's web site for product information such as product alerts and validates the product's maintenance level, retrieves current message translation tables, diagnostic information and databases, and stores the data in the consolidated monitoring tool database at step 210. Message translation tables may include information relating to warning flags or indicators, error symptom strings, expanded text or display, and wizards. For example, a flag or indicator may indicate that an existing event or situation is recoverable, or that a diagnosis exists for a given error string, or that a wizard is available for a given event or situation. Error symptom strings may be defined by the product vendor and may contain information such as program name, failure code, routine name, offsets, or other environmental information. The expanded text or displays provide simplified explanations of the current situation. The wizards correspond to a vendor program which leads a user through proper recovery actions.

Once this information has been retrieved, it is then used by system monitor tool 112 to check new product requirements against existing system resources for user system 102 such as memory available at step 212, and may automatically configure user system 102 to coincide with optimum performance calculations at step 214. The configuration process may involve changes to other components for optimal operation and performance. Thus, during installation of a new component, tuning to other applications within the system occurs automatically as well. Tuning of the different components may also be triggered by an abnormal event. Tuning refers to the process of adjusting an application or system to operate more efficiently in its system environment. For example, a user desires to download free browser software from the Internet. The user successfully performs the download but later discovers that the new browser does not support every possible plug-in. As a result, web sites that the user was previously able to frequent will no longer load properly. The consolidated monitoring tool allows the user to re-install the original browser based upon the error code received. If supported by the vendor, multiple copies of the browser could be kept depending on the plug-in support needed.

In addition to configuration services, the consolidated monitoring tool may also provide diagnostic services and maintenance services to an end user. Diagnostics refers to the detection and isolation of an error in a currently executing application. System monitor tool 112 is a common condition handler that will receive control whenever an abnormal event occurs with the system and it will translate the event into a useful message for the unsophisticated user. Instead of receiving a blank screen or complex unintelligible messages, an expanded text or graphics-based explanation of the event and in some cases a diagnostic tool for recovery is provided for the user. In addition, the system monitor tool may include a list of actions to eliminate future events of the same type. By default, system monitor application 112 allows users to manually execute these actions. However, unsophisticated users may configure system monitor application 112 to automatically execute any actions related to an abnormal event.

Figure 3:
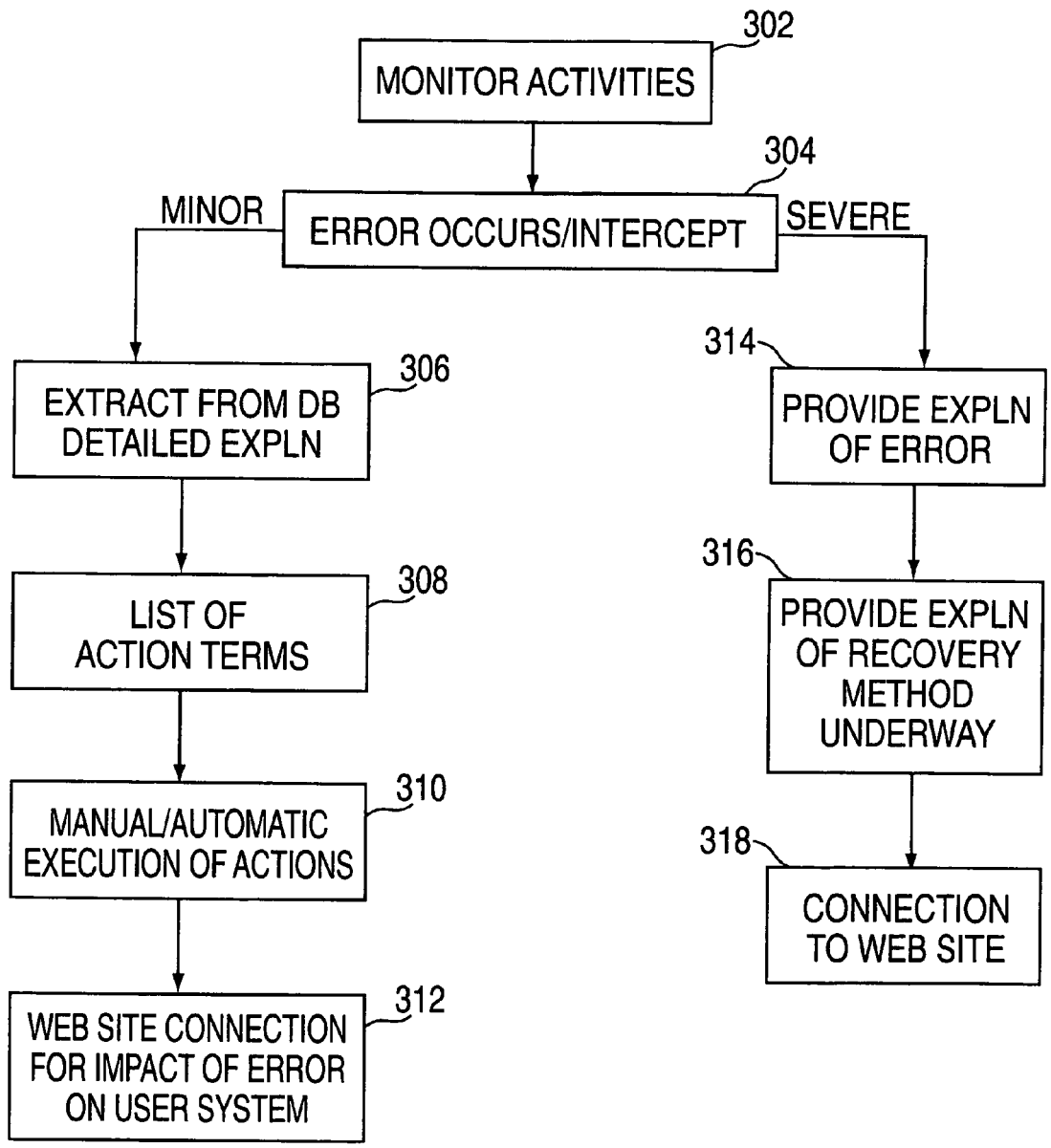
FIG. 3 is an exemplary process flowchart describing the system maintenance and diagnostic services provided by the consolidated monitoring tool during system operation.
Figure 4:
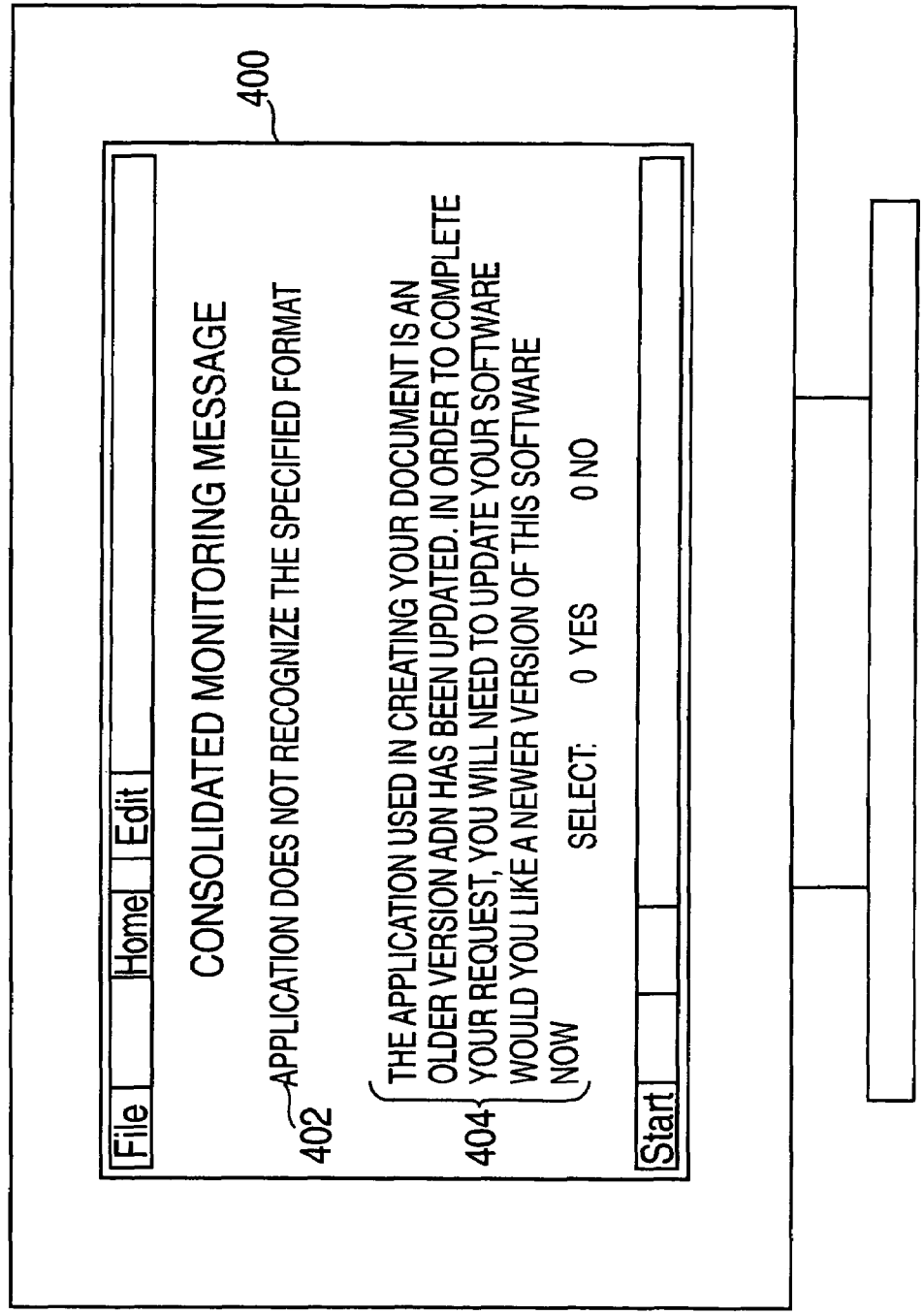
FIG. 4 is an exemplary computer screen window illustrating a sample error message translation provided by the consolidated monitoring tool as seen by an end user.

FIG. 3 further illustrates this process. During system operation, system monitor application 112 monitors activities occurring on applications executing on workstation 103 at step 302. Upon encountering an error, system monitor application 304 intercepts the error at step 304 and, based upon whether the error is minor or severe in nature, the tool will take one of two approaches. If the error is minor, system monitor tool 112 will search the consolidated monitoring tool database and extract a detailed explanation of the error in user friendly terms and present it to the end user at step 306. This step is also referred to the translation step. As noted above, translation tables are provided by the consolidated monitoring tool which store error nomenclature and corresponding explanations. Once an error is encountered, the tool will retrieve the corresponding explanation and present it to the end user at workstation 103. If available, a list of user-friendly action items may be presented to the end user suggesting a course of action at step 308. Such actions may include a system configuration, tuning, and/or upgrade. The tool will query the user to select an option presented directed to whether the user would like to manually execute the action items, or whether the user would prefer to have the tool automatically perform the operation at step 310. The tool may then, if necessary, connect to the failing product's vendor web site to obtain information concerning the impact of the error on the user system at step 312. For example, suppose a user creates a file using a given word processing tool and then tries to copy the file over to a system using an older version of the word processor tool. The user receives an error message because the new processor tool is not supported by the older version. The system monitor tool of the invention would assist the user by providing an option to run a wizard to install a reader for the new version. Alternatively, a demo version may be provided by a supporting vendor in lieu of a reader. This is further illustrated in FIG. 4. A message screen 400 provides an error message 402 which is presented to a user who has attempted to copy a file created in an earlier version of an application to a file supported by a new application version. Error message 402 represents a typical error message displayed for a user before implementation of the consolidated monitoring tool. By contrast, error message 404 represents a message provided by the consolidated monitoring tool which explains the nature of the error encountered and a resolution for the user in layman's terms via the message translation tables.

If the error is severe, system monitor tool 112 will provide a detailed explanation of the error, or translation event at step 314, followed by an explanation of current recovery methods underway at step 316. The information provided by system monitor tool 112 during steps 314 and 316 are based upon historical information stored in the consolidated monitoring tool database. If necessary, the tool will then connect to failing product's vendor web site for assistance at step 318.

The common condition handler of system monitor tool 112 traps abnormal events within a computing device and translates the events by using data gathered by Internet connector application 114. In many instances, the event will require a specific set of actions to be performed to avoid such event in the future.

From time to time, maintenance needs to be applied to the system to correct certain application errors. System monitor application 112 will automatically and periodically apply maintenance for the installed components. Maintenance may be applied as a result of an abnormal event or as a result of a scheduled upgrade. Maintenance may be provided automatically on a scheduled basis, upon occurrence of an error or event, or may be user initiated as desired.

The consolidated monitoring tool provides assistance to computer users when a program error is encountered during system operation. The tool provides simplified explanations of the errors and easy to understand action items for users to take to eliminate or avoid these situations. The tool also provides detailed information that a user can relay to a service provider or product vendor about activities that have transpired in the system including current product level and maintenance data for troubleshooting and analysis purposes.

As described above, the present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While preferred embodiments have been shown and described, various modifications and substitutions may be made thereto without departing from the spirit and scope of the invention. Accordingly, it is to be understood that the present invention has been described by way of illustration and not limitation.

The invention claimed is:

1. A system for managing computer system performance, comprising:
   a workstation including existing installed components, the installed components including at least one of software, hardware device, system upgrade, and a peripheral device;
   a consolidated monitoring tool executing on the workstation, the consolidated monitoring tool monitoring activities occurring on the workstation with respect to the existing installed components; and
   a communications link to a vendor system, the vendor system supplying at least one of a component and service to the workstation;
      wherein upon encountering an error relating to the at least one of a component and a service of the workstation, the consolidated monitoring tool performs:
         searching a database at the workstation for the error, the database including product information relating to the existing installed components, comprising:
            product name, current release level, current maintenance level, web site address for each vendor system associated with the existing installed components, product alerts, validation of the product's maintenance level, current message translation tables, and diagnostic information;
         if the error is a minor error:
            retrieving from the database, and displaying on the workstation, a corresponding explanation of the minor error for a user via the current message translation tables stored in the workstation; and
            displaying a corresponding set of action items for resolving the minor error or preventing a future occurrence of the minor error; and
      wherein, if the error is a severe error relating to the at least one of a component and a service of the workstation, the consolidated monitoring tool performs:

retrieving from the database, and displaying on the workstation, a detailed explanation of the severe error, an explanation of a recovery plan underway to correct the severe error, and connecting to a vendor system web site for assistance, the vendor system supplying the at least one of a component and a service to the workstation.

2. A method for managing computer system performance, comprising:

monitoring activities occurring on a workstation, the workstation including existing installed components, the existing installed components including at least one of software, hardware device, system upgrade, and a peripheral device; and upon encountering an error relating to the at least one of a component and a service of the workstation, the consolidated monitoring tool performs:

searching a database at the workstation for the error, the database including product information relating to the existing installed components, comprising:

product name, current release level, current maintenance level, web site address for each vendor system associated with the existing installed components, product alerts, validation of the product's maintenance level, current message translation tables, and diagnostic information;

if the error is a minor error:

retrieving from the database, and displaying on the workstation, a corresponding explanation of the minor error for a user via the current message translation tables stored in the workstation; and displaying a corresponding set of action items for resolving the minor error or preventing a future occurrence of the minor error; and wherein, if the error is a severe error relating to the at least one of a component and a service of the workstation, the consolidated monitoring tool performs:

retrieving from the database, and displaying on the workstation, a detailed explanation of the severe error, an explanation of a recovery plan underway to correct the severe error, and connecting to a vendor system web site for assistance, the vendor system supplying the at least one of a component and a service to the workstation.

3. A storage medium encoded with machine-readable computer program code for managing computer system performance, the storage medium including instructions for causing a workstation to implement a method, comprising:

monitoring activities occurring on the workstation, the workstation including existing installed components, the installed components including at least one of software, hardware device, system, upgrade, and a peripheral device; and upon encountering an error relating to the at least one of a component and a service of the workstation, the consolidated monitoring tool performs:

searching a database at the workstation for the error, the database including product information relating to the existing installed components, comprising:

product name, current release level, current maintenance level, web site address for each vendor system associated with the existing installed components, product alerts, validation of the product's maintenance level, current message translation tables, and diagnostic information;

if the error is a minor error:

retrieving from the database, and displaying on the workstation, a corresponding explanation of the minor error for a user via the current message translation tables stored in the workstation; and displaying a corresponding set of action items for resolving the minor error or preventing a future occurrence of the minor error; and wherein, if the error is a severe error relating to the at least one of a component and a service of the workstation, the consolidated monitoring tool performs:

retrieving from the database, and displaying on the workstation, a detailed explanation of the severe error, an explanation of a recovery plan underway to correct the severe error, and connecting to a vendor system web site for assistance, the vendor system supplying the at least one of a component and a service to the workstation.

4. The system of claim 1, wherein the peripheral device includes at least one of a printer, a scanner, a facsimile, and a data storage facility.

5. The method of claim 2, wherein the peripheral device includes at least one of a printer, a scanner, a facsimile, and a data storage facility.

6. The storage medium of claim 3, wherein the peripheral device includes at least one of a printer, a scanner, a facsimile, and a data storage facility.

7. The system of claim 1, wherein the message translation tables include at least one of:

a warning flag;
error symptom strings;
expanded text or display; and
a wizard.

8. The system of claim 7, wherein the warning flag indicates at least one of:

an existing event or situation is recoverable;
a diagnosis exists for a given error string; and
a wizard is available for a given event.

9. The system of claim 7, wherein the error symptom strings contain at least one of a program name, a failure code, routine name, and offsets.

10. The system of claim 7, wherein the expanded text or display include explanations of an event or condition.

11. The method of claim 2, wherein the message translation tables include at least one of:

a warning flag;
error symptom strings;
expanded text or display; and
a wizard.

12. The method of claim 11, wherein the warning flag indicates at least one of:

an existing event or situation is recoverable;
a diagnosis exists for a given error string; and
a wizard is available for a given event.

13. The method of claim 11, wherein the error symptom strings contain at least one of a program name, a failure code, routine name, and offsets.

14. The method of claim 11, wherein the expanded text or display include explanations of an event or condition.

15. The storage medium of claim 3, wherein the message translation tables include at least one of:

a warning flag;
error symptom strings;
expanded text or display; and
a wizard.

16. The storage medium of claim 15, wherein the warning flag indicates at least one of:

an existing event or situation is recoverable;

a diagnosis exists for a given error string; and
a wizard is available for a given event.

17. The storage medium of claim 15, wherein the error symptom strings contain at least one of a program name, a failure code, routine name, and offsets.

18. The storage medium of claim 15, wherein the expanded text or display include explanations of an event or condition.

* * * * *